June 2, 1936. F. A. NIEMANN ET AL Re. 19,994

DEVICE FOR DISTRIBUTION OF ACCOUNTS

Original Filed May 13, 1931 3 Sheets-Sheet 1

Inventor:
Frederick A. Niemann
and
Kurt F. Riehm
John C. Carpenter
Atty.

DEVICE FOR DISTRIBUTION OF ACCOUNTS
Original Filed May 13, 1931 3 Sheets-Sheet 2
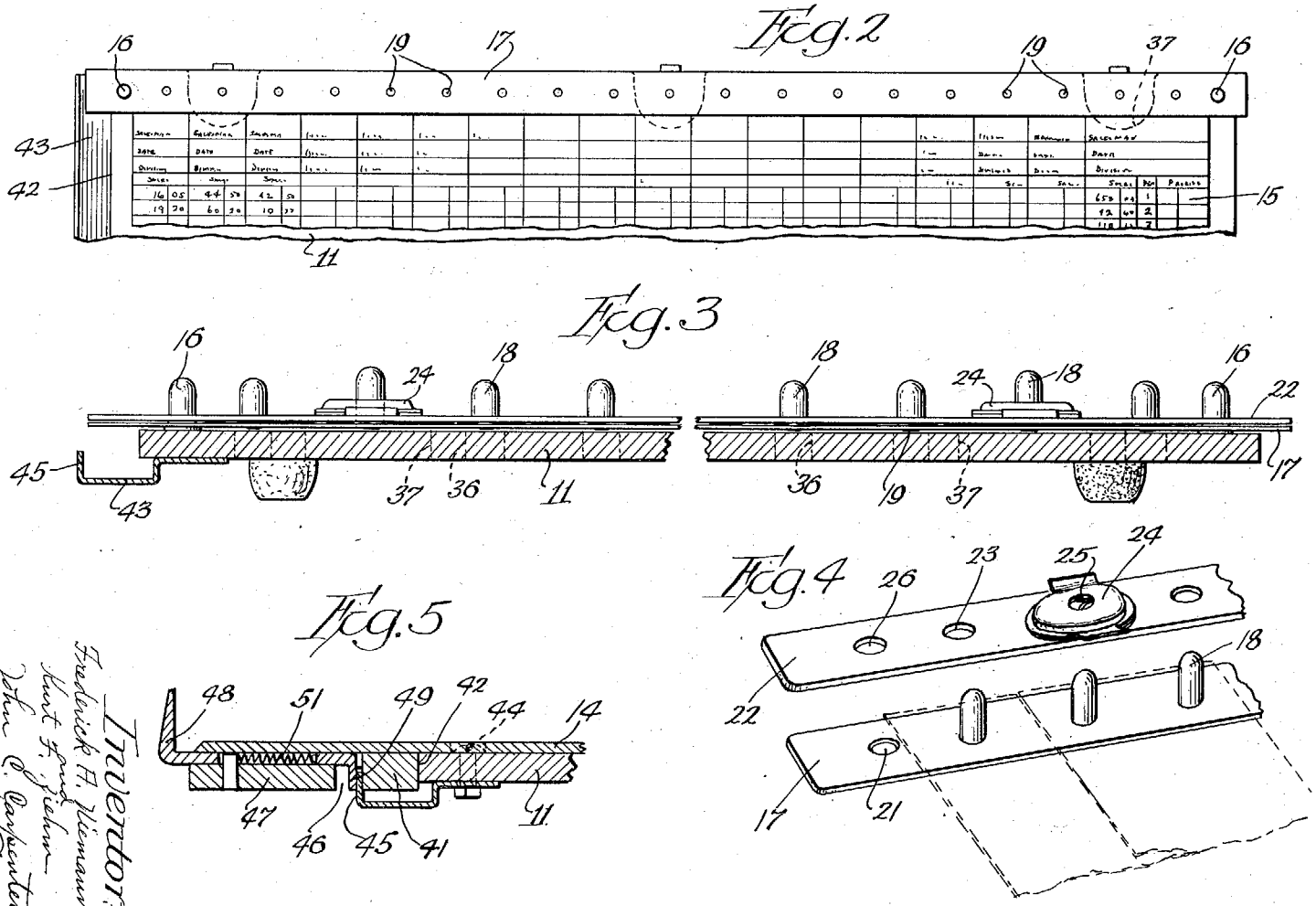
Inventor:
Frederick A. Niemann
Kurt F. Ziehm
John C. Carpenter
Atty.

DEVICE FOR DISTRIBUTION OF ACCOUNTS

Original Filed May 13, 1931 3 Sheets-Sheet 3

Inventor:
Frederick A. Niemann
Kurt F. Liehm
John C. Carpenter Atty.

Reissued June 2, 1936

Re. 19,994

UNITED STATES PATENT OFFICE 19,994

DEVICE FOR DISTRIBUTION OF ACCOUNTS

Frederick A. Niemann and Kurt F. Ziehm, Chicago, Ill., assignors to Felt & Tarrant Mfg. Co., Chicago, Ill., a corporation of Illinois Original No. 1,884,814, dated October 25, 1932, Serial No. 537,192, May 13, 1931. Application for reissue August 15, 1934, Serial No. 740,655

14 Claims. (Cl. 120—33)

This invention relates in general to a device for facilitating computation of like items individually displayed upon a multiplicity of separate similar record sheets, and has more particular reference to the provision of an arrangement of such record sheets and means for maintaining such record sheets so arranged upon a backing support that a line guide arranged across said sheets, each having a series of items of similar character and individually differing, may be readily shifted to accurately indicate said items for laterally extending or totaling them.

The invention contemplates the provision of record sheets provided with columns of significant data along each of its side edges and upon both of their faces and the arrangement of such sheets upon said backing support with the desired columns to be extended or totalized (as to like items) arranged in closely adjacent relationship so that in the use of the line guide the operator or accountant need only follow along the line guide setting up the successively presented items of the successive strips or record sheets on an adding or calculating machine.

The invention has for one of its principal objects the provision of improved and efficient means in connection with said backing support for engaging and holding the ends of the record sheets or strips so that they may be held accurately in the desired predetermined position and relationship against inadvertent disturbance throughout the calculations.

Another important object of the invention is the provision of strip or sheet holding means which will clamp the sheets or strips in the desired relationship and which, after computations have been completed of the items upon the presented faces of the strips or sheets, the strip holding or clamping means and the held strips or sheets may be readily removed from the backing support and reversed as a unit to present the opposite or back faces of said strips or sheets.

Numerous other objects and advantages of the invention will be apparent as it is better understood from the following description, which, when taken in connection with the accompanying drawings, illustrate a preferred embodiment thereof.

On the drawings,

Fig. 2 is a partial plan view of the same showing the top and the sheets and sheet holding means reversed in position;

Fig. 3 is a transverse vertical section, somewhat enlarged, showing the sheet holding means in elevation;

Fig. 4 is an enlarged perspective detail of an end of the sheet or strip holding means;

Fig. 5 is an enlarged partial section taken on the line 5—5 of Fig. 1; and

Figure 1:
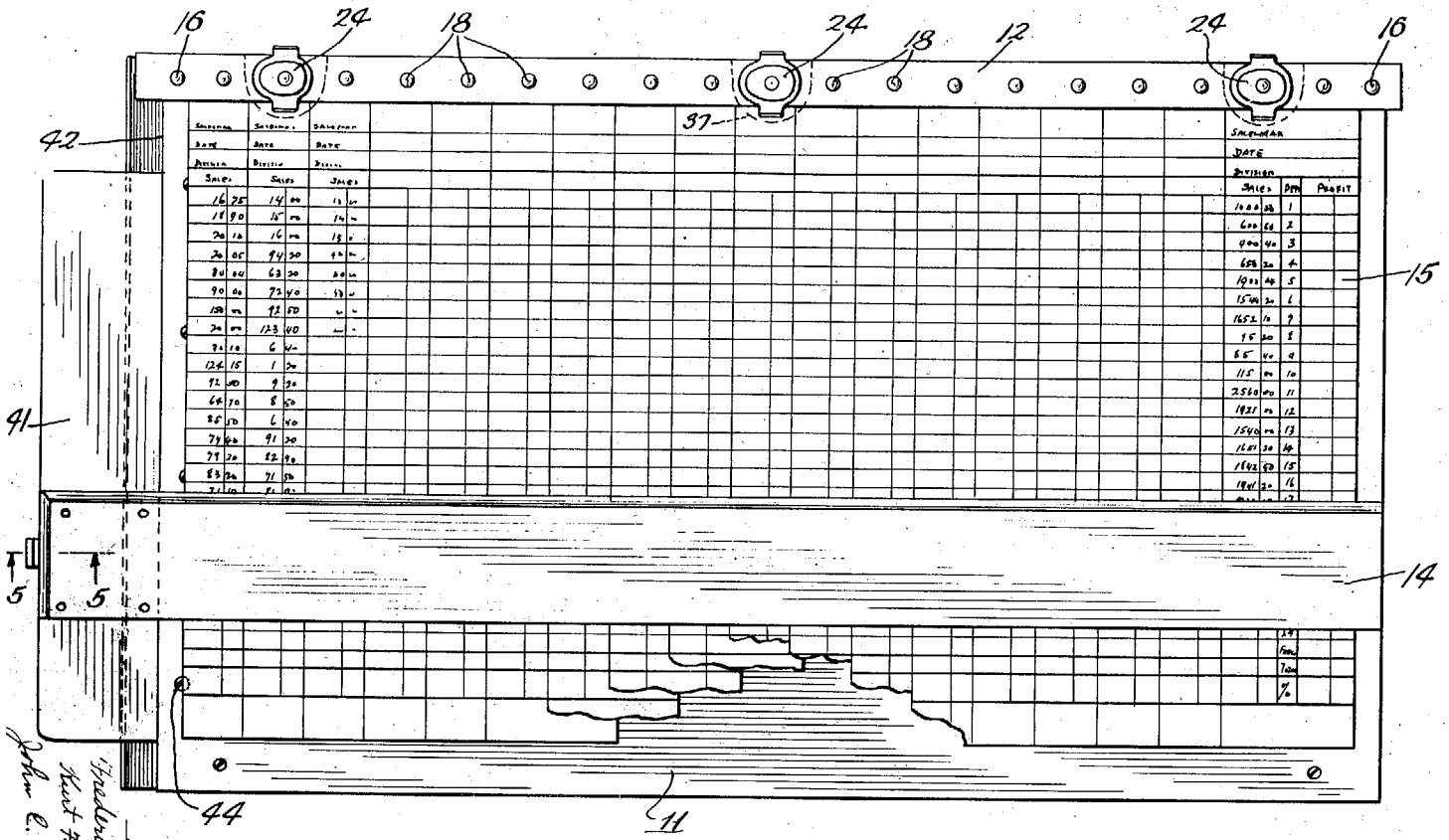
Figure 1 is a plan view of a record sheet holder and the contained sheets in which the instant invention is embodied.

The record sheet holder shown on the drawings and constituting the embodiment of the invention at present preferred comprises generally a backing support or base 11, strip or sheet holding means 12 arranged at the upper edge of the back support 11 to engage the ends of the sheets or strips and hold them in desired predetermined position and relationship, and a line guide 13 which extends across the backing support and is adapted to slide up and down into accurate registration with the alined items of the presented column of the record sheets or strips held in position by the strip clamping means 12.

The backing support 11 may be of any desired material for backing or supporting the held strips, generally indicated by reference character 15, in the registration given them by the clamping means 12. At its top the backing support is provided with two upstanding pins 16, in the present embodiment of the invention, for receiving in accurate predetermined position the sheet or strip clamping means 12, and these pins constitute attaching means for holding the sheet or strip clamping means 12 in original and reversed position, all as will be presently more fully described.

The sheet or strip clamping means 12, in the preferred embodiment of the invention shown on the drawings, comprises a peg or pin carrier 17 in which or on which a plurality of upwardly projecting pins or pegs 18 are arranged at regularly spaced intervals. The pegs 18 are conveniently secured to the member 17 by riveting them through the member 17, as indicated at 19. The member 17 is provided also with end openings 21 adapted to frictionally fit over the attaching pegs or pins 16 of the backing support to hold the strip 17 in place. The clamping means 12 also comprises a confining strip or bar 22 adapted to be brought down upon the positioned record sheets or strips to hold them against inadvertent displacement or disturbance after arrangement.

This strip or bar 22 is provided with openings or apertures 23 spaced in accordance with the spacings of the pegs 18 so that the pegs 18 may extend through the openings 23 when the strip or bar 22 is positioned. The confining strip or bar 22 is provided with one or more devices for securely holding it in position, this being of more particular importance where and in accordance with the attainment of the full purposes of this invention it is intended that the clamping means 12 and the clamped sheets and strips of records are intended for reversal. Three such devices are provided in the structure shown on the drawings and each consists of a clamping member 24 enclosing a spring 25 adapted to engage over and grip an appropriately arranged peg 18 as the strip or bar 24 is moved down to record sheet or strip holding position.

The strip or bar 22 is also preferably provided with end openings or apertures 26 adapted for registration with the apertures 21 of the member 17, already described, and accordingly adapted also for frictional engagement with the end pins or pegs 16 on the backing support 11.

Figure 6:
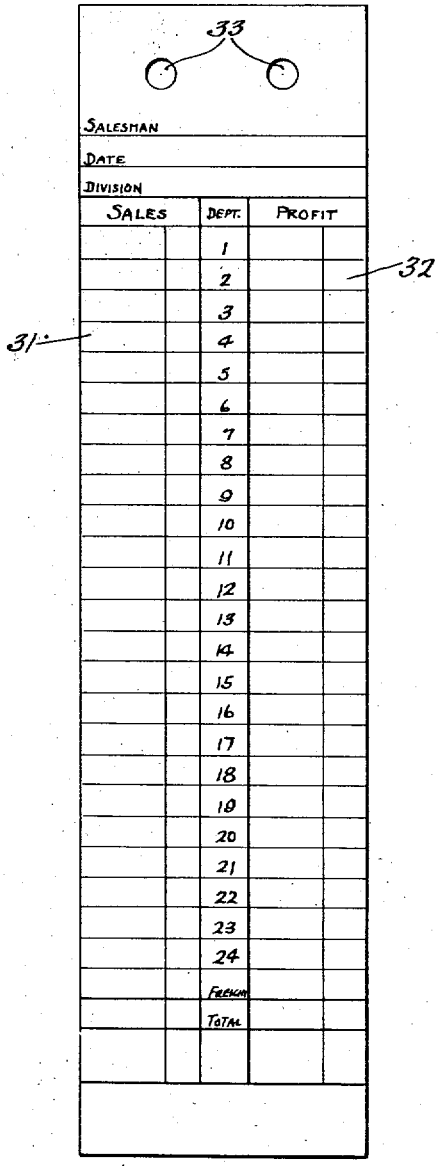
Figs. 6 and 7 are enlarged detail views of the front and rear of a record sheet or strip particularly adapted for employment with the record sheet holder shown in the earlier numbered figures, it being understood that from certain aspects such record sheet or strip and its equivalents are within the purview of this invention.
Figure 7:
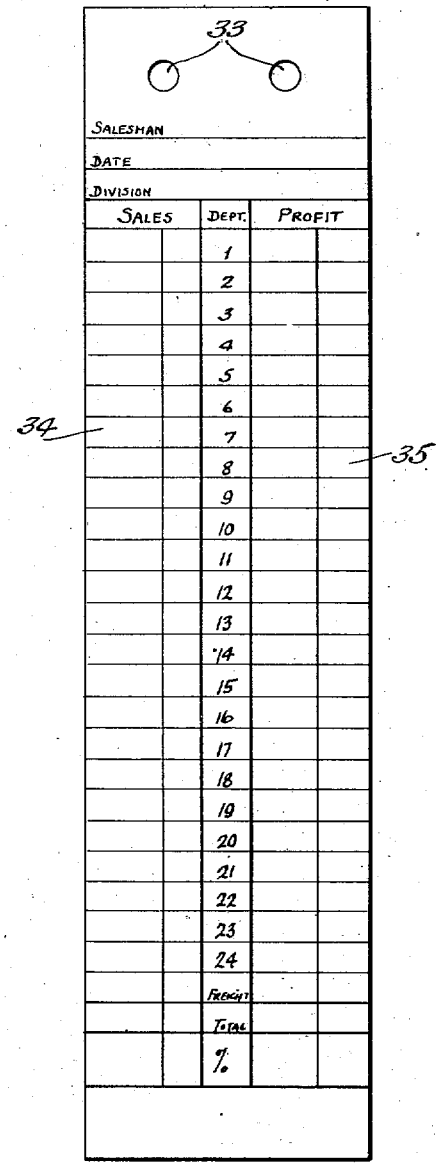

Referring now to Figs. 6 and 7, the record sheets or strips are provided with marginal columns 31 and 32 of substantially like width, and each strip is perforated, as indicated at 33, with perforations so located with respect to said marginal columns as to permit engagement with the pegs 18 to arrange the marginal columns at like sides of successive strips to be exposed when the strips are arranged in overlapping relationship, i. e. with the left hand perforation of the next succeeding right hand strip impaled over the right hand peg of the next preceding strip. Thus constructed the record sheet holder of the drawings and said strips are adapted to optionally expose only either the right or left columns of successive strips in closely adjacent relationship and without intervening or interposed numerical data or items.

In accordance with the present invention the record sheet or strip holding means 12 is reversible with its clamped sheets or strips and said sheets or strips are provided on both of their surfaces with like spaces and columns for the reception of inscribed data to be extended and added laterally, as indicated by reference characters 34 and 35 in Fig. 7.

In order that the clamping means for holding the record sheets or strips may be reversed to present opposite or rear faces of said sheets or strips and without requiring repositioning of the record holding sheets or strips, the entire clamping device or means is detachable as a single unit from the pegs or pins 16 and may be turned end for end to an inverted position re-engaging said pegs or pins 16.

In the instant embodiment of the invention the backing support 11 is perforated at 36 to receive the pegs 18, and is recessed at 37 to accommodate clamping members 24.

The line guide 14 is arranged across the backing support 11 and is slidable lengthwise of the columns of inscribed data. It is provided with a head 41 engaging a side 42 of the backing support to insure accurate positioning across the columns. It is preferably detachably held in place by mechanism to be now described.

A guide 43 is preferably secured by screws 44 on the underside of the backing support 11 and provides an upstanding flange 45 adapted to enter into a groove 46 extending lengthwise of the head 47 of the line guide 14. A manually operable slide 48, having an end 49 arranged in the groove 46 to press against the flange 45, is provided and is normally urged into holding engagement with this flange by a spring 51.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A record sheet holder, comprising a backing support for a multiplicity of strips of paper having edge columns of numerical data, a clamping device for engaging and holding said multiplicity of strips of paper in overlapped relation and with only predetermined columns of data exposed on opposite faces of said strips, said clamping device being reversibly attachable to said backing support to optionally display the exposed columns on the two sides of said strips.

2. A record sheet holder, comprising a backing support for a multiplicity of strips of paper having columns of numerical data upon their faces and along their edges, and a clamping device separate from said backing support and attachable thereto and comprising pegs for receiving said strips in overlapping relation and a retaining member engageable over said pegs, said clamping device as a unit and the multiplicity of strips held thereby being reversibly engageable with said backing support to arrange said multiplicity of strips upon said backing support with front or back faces exposed.

3. A record sheet holder, comprising a backing support for a multiplicity of strips of paper having columns of numerical data, a clamping device for engaging and holding said multiplicity of strips of paper in predetermined desired position and relationship, said clamping device being reversible, and an edge of said backing support being formed to receive said clamping device in reversed position.

4. A record sheet holder, comprising a backing support for a multiplicity of strips of paper having columns of numerical data, a clamping device for engaging and holding said multiplicity of strips of paper in overlapped relation and with only predetermined columns of data exposed on opposite faces of said strips, said clamping devices being reversibly arrangeable on said backing support to optionally display the exposed columns on the two sides of said strips.

5. A record sheet holder, comprising a backing support for a multiplicity of strips of paper having edge columns of numerical data, a retaining device engaging and holding said multiplicity of strips of paper in overlapped relation and with only predetermined columns of data exposed on opposite faces of said strips, said retaining device being reversibly attachable to said backing support to optionally display the exposed columns on the two sides of said strips.

6. A record sheet holder, comprising a backing support for a multiplicity of strips of paper having columns of numerical data upon their faces and along their edges, and a holding member separate from said backing support and attachable thereto and comprising pegs for receiving said strips in overlapping relation and a retaining device, said holding member as a unit and the multiplicity of strips held thereby being reversibly engageable with said backing support to arrange said multiplicity of strips upon said backing support with front or back faces exposed.

7. A record sheet holder, comprising a backing support for a multiplicity of strips of paper having columns of numerical data, a retaining device for engaging and holding said multiplicity of strips of paper in predetermined desired position and relationship, said retaining device being reversible, and an edge of said backing support being formed to receive said retaining device in either position.

8. A record sheet holder, comprising a backing support for a multiplicity of strips of paper having columns of numerical data, a holding device for engaging and maintaining said multiplicity of strips of paper in overlapped relation and with only predetermined columns of data exposed on opposite faces of said strips, said holding device being reversibly arrangeable on said backing support to optionally display the exposed columns on the two sides of said strips.

9. A record sheet holder, comprising a backing support for a multiplicity of strips of paper having edge columns of numerical data, a retaining device engaging and holding said multiplicity of strips of paper in overlapped relation and with only predetermined columns of data exposed on opposite faces of said strips, said retaining device being reversibly attachable to said backing support to optionally display the exposed columns on the two sides of said strips, and means for removably securing said retaining device to said backing support in either position.

10. A record sheet holder, comprising a backing support for a multiplicity of strips of paper having columns of numerical data, a holding device for engaging and maintaining said multiplicity of strips of paper in overlapped relation and with only predetermined columns of data exposed on opposite faces of said strips, said holding device being reversibly arrangeable on said backing support to optionally display the exposed columns on the two sides of said strips, and means for reversibly securing said retaining device to said backing support.

11. In a tabulating device having a backing support for a multiplicity of strips of paper having columns of numerical data and a line guide extending across said multiplicity of strips upon said backing support; a retaining device engaging an edge of each of said strips of paper to maintain said multiplicity of strips of paper in predetermined and desired relation, and means for reversibly attaching said retaining device to said backing support.

12. In a record sheet holder adapted to be positioned on a suitable backing support, a holding member including a plurality of upstanding members for receiving a multiplicity of strips of paper in predetermined laterally spaced shingled relationship, and a retaining device, and means for reversibly securing said holding member as a unit and the multiplicity of strips held thereby on said backing support to arrange said multiplicity of strips upon said backing support with front or back faces exposed.

13. A record sheet holder, comprising a backing support for a multiplicity of strips of paper having columns of numerical data, and a strip clamping device for engaging and clamping an end of each of said multiplicity of strips to hold them in predetermined and desired relation, said clamping device being attachable to and detachable from an edge of said backing support.

14. A record sheet holder, comprising a backing support for a multiplicity of strips of paper having columns of numerical data, means associated with said backing support for engaging the ends of said strips of paper to retain them in predetermined desired position and in shingled relationship on said backing support, said means comprising a reversible holder detachable from said backing support, and adapted to be reversibly attached in position to expose columns upon the opposite faces of said strips.

FREDERICK A. NIEMANN.
KURT F. ZIEHM.